(12) United States Patent
White

(10) Patent No.: US 10,794,427 B2
(45) Date of Patent: Oct. 6, 2020

(54) BEARING RING WITH INSULATING COATING

(71) Applicant: Schaeffler Technologies AG & Co. KG, Herzogenaurach (DE)

(72) Inventor: Michael White, Lake Wylie, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 1013 days.

(21) Appl. No.: 15/091,025

(22) Filed: Apr. 5, 2016

(65) Prior Publication Data

US 2017/0284468 A1 Oct. 5, 2017

(51) Int. Cl.
*F16C 33/62* (2006.01)
*F16C 33/64* (2006.01)

(52) U.S. Cl.
CPC .............. *F16C 33/62* (2013.01); *F16C 33/64* (2013.01); *F16C 2202/30* (2013.01); *F16C 2206/44* (2013.01)

(58) Field of Classification Search
CPC .. F16C 33/62; F16C 2206/44; F16C 2204/20; F16C 2204/60; F16C 43/06; F16C 33/64; C25D 3/44; B32B 15/01; H01M 8/021
See application file for complete search history.

(56) References Cited

U.S. PATENT DOCUMENTS

| | | | |
|---|---|---|---|
| 1,152,680 A | 9/1915 | Wieselgreen | |
| 3,273,944 A | 9/1966 | Hammon | |
| 3,775,260 A | 11/1973 | Capuano et al. | |
| 3,924,906 A | 12/1975 | Kitaoka | |
| 4,071,415 A * | 1/1978 | Wong | C25D 3/44 |
| | | | 204/234 |
| 4,417,954 A | 11/1983 | Birkle et al. | |
| 4,704,298 A | 11/1987 | Herman et al. | |
| 5,059,041 A | 10/1991 | Watanabe et al. | |
| 8,314,053 B2 | 11/2012 | Jensen et al. | |

(Continued)

FOREIGN PATENT DOCUMENTS

| | | |
|---|---|---|
| CN | 101228362 A | 7/2008 |
| CN | 101395394 A | 3/2009 |

(Continued)

OTHER PUBLICATIONS

"Applications for AlumiPlate Electrodeposited Aluminum" <http://www.alumiplate.com/html/body_applications.html> (Year: 2007).*

*Primary Examiner* — Lee A Holly
(74) *Attorney, Agent, or Firm* — Volpe and Koenig, P.C.

(57) ABSTRACT

A non-conventional, low temperature, process for applying a thin electrically insulating coating arrangement with high density, high purity, minimal porosity, and improved adhesion strength to a steel bearing component is provided. The bearing component is formed from steel and machined or otherwise formed to a near net shape. A high purity aluminum is electro-chemically deposited on the steel bearing component using a non-aqueous electrolyte in an inert environment to form a high purity aluminum coating at least over a portion of the steel bearing component. A surface of the high purity aluminum coating is then converted by an acid-bath into aluminum oxide to form an insulating layer. A bearing component and a bearing having such components is also provided.

18 Claims, 3 Drawing Sheets

Figure 3

(56) References Cited

U.S. PATENT DOCUMENTS

| | | | |
|---|---|---|---|
| 8,425,120 B2 | 4/2013 | Konno et al. | |
| 2008/0241517 A1* | 10/2008 | Kenworthy | B32B 15/01 |
| | | | 428/332 |
| 2010/0247018 A1* | 9/2010 | Bristol | F16C 43/06 |
| | | | 384/569 |
| 2013/0209006 A1 | 8/2013 | Kolev et al. | |
| 2013/0326880 A1* | 12/2013 | Kamamoto | F16C 33/64 |
| | | | 29/898 |
| 2014/0030632 A1* | 1/2014 | Larsen | H01M 8/021 |
| | | | 429/507 |

FOREIGN PATENT DOCUMENTS

| | | |
|---|---|---|
| CN | 104028811 A | 9/2014 |
| CN | 204584366 U | 8/2015 |
| DE | 4038139 | 6/1992 |
| EP | 2628822 | 8/2013 |

* cited by examiner

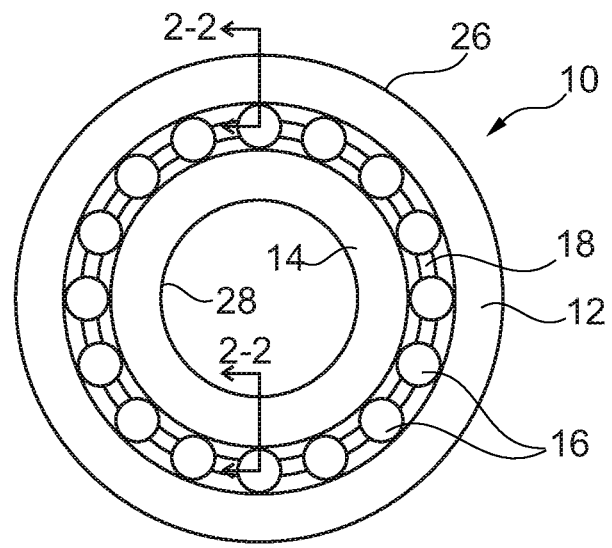
Fig. 1
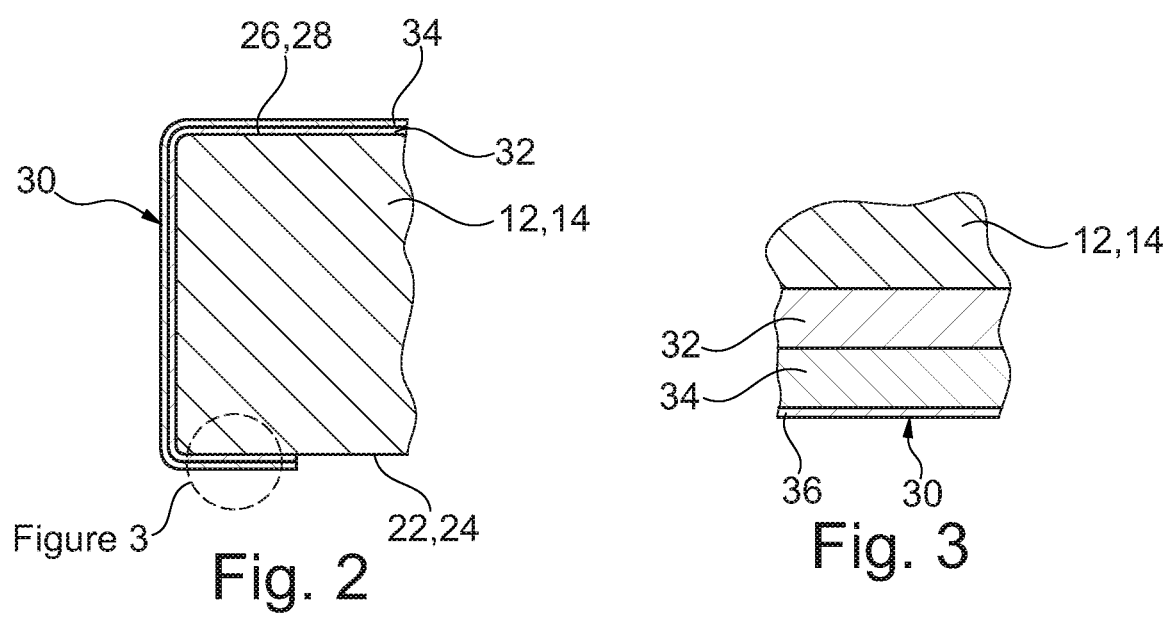
Fig. 2
Fig. 3

BEARING RING WITH INSULATING COATING

FIELD OF THE INVENTION

The present invention relates to devices for insulating shaft electrical currents in electrical machines such as AC and DC electrical motors, generators, alternators, and other rotating shaft machines. More specifically, the invention relates ceramic electrically insulated rolling element bearings.

BACKGROUND

The advent, development, and increasing use of electrical machines coupled to Pulse Width Modulated (PWM) variable speed inverter drives utilizing rapid switching devices such as Insulated Gate Bi-Polar Transistors (IGBTs) has resulted in an increase in rolling element bearing failures in electrical machines. The reduced bearing life and increased rate of bearing failures is due to bearing currents flowing from the rotating shaft to the machine frame through the bearings. Such bearing currents manifest as damage due to Electrical Discharge Machining (EDM) between the bearing raceways and rolling elements thus causing physical mechanical damage of the bearing raceways and rolling elements which may ultimately cause premature failure of the bearing assembly.

Shaft induced electrical currents are inherent to electric motors and generators due to mechanical asymmetries in the electrical machine. Additionally, due to the very high rate of switching frequencies of PWM inverter drives, the Common Mode Voltage (CMV) is increased over non-PWM driven machines. This increased CMV causes a difference in electrical potential between the rotor shaft and the stator frame of the machine. When the CMV potential exceeds the impedance of the bearings, a current is induced in the shaft, and the current passes through the bearings seeking ground, potentially causing EDM damage to the bearings.

During static (stationary) conditions the lubricant (e.g. oil or grease) is displaced between the rolling element and raceway mating surfaces in contact and under load thus causing a low resistance for electrical currents to pass between the rolling elements and raceway surfaces.

During transient (startup condition greater than ~15% of rated rotational speed) and normal steady-state operating conditions, a lubricant film thickness is generated and maintained between the rolling element and raceway surfaces. This Elasto-Hydrodynamic Lubricant (EHL) film thickness causes the mating surfaces to separate from contact and "ride" on a film of lubricant.

Many methods have been employed to prevent shaft induced currents from causing EDM damage to the bearings. Such technologies include di-electric ceramic coatings such as aluminum oxide or silicon oxide on the bearing external surfaces or bearing housing, use of Faraday shields to prevent the charge build-up on shafts, electrically conductive bearing grease, and shaft-contacting ground brushes made of electrically conductive materials such as copper, brass, or carbon.

Di-electric ceramic bearing coatings have been utilized with some success but have several drawbacks. The coating is very hard and brittle and can fracture during installation or after installation under mechanical load. These di-electric ceramic coatings have limited di-electric strength due to porosity.

Typically, these ceramic insulating coatings are applied to the metal substrate through the High Velocity Oxygen Flame (HVOF), Low Pressure Plasma, or other high temperature deposition processes. The resulting coating is inherently porous due to an imperfect deposition process. Additionally, the ceramic material must be heated to very high temperatures during the deposition process which can negatively affect the metal substrate material (e.g. material microstructure, hardness, heat treatment). The metal deposition process such as HVOF or Low Pressure Plasma also produces a relatively impure ceramic coating. The resulting coating will have limited di-electric strength due to the porous and impure structure of the coating, which includes numerous voids and impurities. At high voltage potential, current can pass through these voids and imperfections inherent within the coating structure, causing an arc that compromises the coating, passing through the coating and potentially causing EDM damage to the bearing.

The coating porosity can also promote crack formation when mechanical load is applied to the coating. The resulting cracks can allow current to pass through the coating resulting in damage to the bearing.

Ceramic insulating coatings applied via HVOF, or Low Pressure Plasma deposition processes also have limited adhesion strength to the substrate material.

Faraday shields have been employed with success but are very expensive to implement in most applications in industry.

Electrically conductive grease allows the current to continuously pass through the bearing surfaces but may contain elements such as copper, carbon, or phosphorus which can cause excessive wear of the bearing surfaces leading to premature failure of the bearing.

Spring loaded shaft grounding brushes are also prone to issues such as excessive wear, material transfer, and oxide formation on the mating surface. Such oxides can become a di-electric and may prevent effective current transfer from the shaft to ground. This can cause electrical arcing and lead to damage of the shaft. Additionally, once the impedance of the shaft grounding brush exceeds the impedance of the bearings, the current can seek ground through the bearings once again potentially causing EDM damage to the bearings. Shaft grounding brushes may also vibrate due to imperfections in the shaft surface such as an out of round condition. When the brush momentarily loses contact with the shaft during vibration, the current can arc from the brush to the shaft thus causing EDM damage to the shaft. Alternatively, the current can flow through the bearings if the voltage potential is sufficiently high while the brush loses contact with the shaft during vibration. Traditional spring loaded shaft grounding brushes are prone to rapid and excessive wear and can ultimately lose contact with the shaft causing the current to seek ground through the bearing potentially causing EDM damage in the bearing. Finally, the shaft grounding brushes are not usually installed close to the bearing which is usually the component of most concern. Close proximity of grounding near the bearing is essential to protecting the integrity of the bearing surfaces.

What is needed in the art is an electrically insulating coating with high density, high purity, minimal porosity, and improved adhesion strength to the substrate material.

Historically, the HVOF, Low Pressure Plasma, and other high temperature material deposition processes have been utilized to deposit an aluminum oxide ceramic coating, or variant thereof, to the metal bearing substrates (steel bearing inner or outer rings). This is due to conventional acid bath electrochemical depositing (plating) processes not being feasible for depositing aluminum to steel substrates.

SUMMARY

A non-conventional, low temperature, process for applying a thin electrically insulating coating arrangement with high density, high purity, minimal porosity, and improved adhesion strength to a steel bearing component is provided. The bearing component is formed from steel and machined or otherwise formed to a near net shape. A high purity aluminum is first electro-chemically deposited on the steel bearing component using a non-aqueous electrolyte, such as Toluene, in an inert environment to form a high purity aluminum coating at least over a portion of the steel bearing component. A surface of the high purity aluminum coating is then converted by an acid-bath into aluminum oxide. This is typically referred to as acid anodization, and forms an insulating layer.

Optionally, the insulating layer is sealed.

Preferably, the high purity aluminum has a final thickness of 25-200 µm, and more preferably 50-100 µm.

Preferably, the insulating layer has a final thickness of 25-200 µm, and more preferably 50-100 µm.

Preferably the high purity aluminum and the aluminum oxide insulating layer have less than 2% voids or inclusions, and more preferably less than 0.2% voids or inclusions. In accordance with the preferred method, there are virtually zero voids or inclusions as indicated by a test sample examined at a 2500:1 scale enlargement.

In one embodiment, a surface of the steel bearing component to be coated with the high purity aluminum has a surface roughness Ra of greater than 4 µm for enhanced adhesion of the high purity aluminum.

In one embodiment, a raceway surface of the bearing component is masked prior to the electro-chemical coating with pure aluminum and/or the acid bath conversion of the surface of the high purity aluminum coating into aluminum oxide.

Preferably, the insulating layer or the sealed insulating layer has a resistance of at least 10 MΩ at 50 VDC. More preferably the insulating layer or the sealed insulating layer has a resistance of at least 50 MΩ at 1000 VDC.

Optionally, the raceway surface of the steel bearing component can be finished after forming the insulating layer.

A steel bearing component as well as a rolling bearing having a steel bearing component with the insulating layer formed by the above method is also provided. The rolling bearing preferably includes an inner ring, outer ring, and a plurality of rolling elements, such as balls or rollers. The inner ring and/or the outer ring include the insulating coating applied to, at a minimum, either the outer mounting surface of the outer ring or the inner mounting surface of the inner ring, or both inner and outer ring mounting surfaces. This provides an EDM resistant rolling bearing.

BRIEF DESCRIPTION OF THE DRAWINGS

The foregoing Summary as well as the following Detailed Description will be best understood when read in conjunction with the appended drawings. In the drawings:

FIG. 1 is an elevational view of a rolling bearing including one or more bearing components with an insulating coating.

FIG. 2 is a greatly enlarged cross-sectional view through either of the bearing rings as indicated by lines 2-2 in FIG. 1 showing the insulating coating applied to one or both of the bearing rings.

FIG. 3 is a greatly enlarged cross-sectional view showing the insulating coating on the bearing component of FIG. 2.

DETAILED DESCRIPTION OF THE PREFERRED EMBODIMENTS

Figure 4:
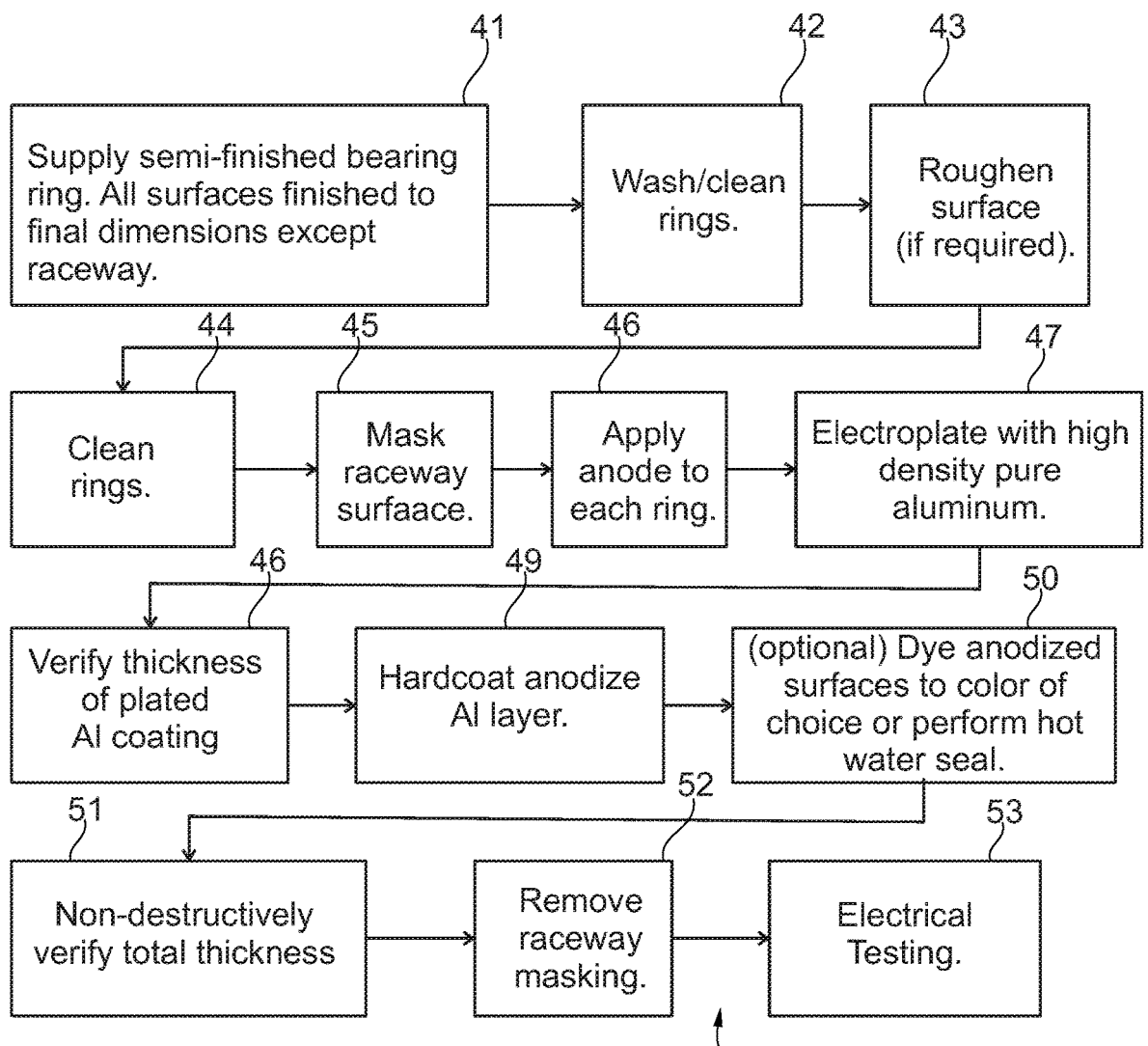
FIG. 4 is a flow chart showing the process for applying and insulating coating on a bearing component according to one embodiment.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Referring to FIG. 1, a rolling bearing 10 including an outer ring 12 and an inner ring 14 is shown. The outer ring 12 and the inner ring 14 are bearing components formed of bearing grade steel. Rolling elements 16 are located between the outer ring 12 and the inner ring 14. The rolling elements are preferably spaced apart via a cage 18.

As shown in detail in FIG. 2, at least one of the inner ring 14 or the outer ring 12 include, at least over a portion thereof, an insulating coating arrangement 30 having a layer of high purity aluminum 32 located on the steel used to form the inner ring 14 or the outer ring 12. The high purity aluminum coating 32 includes an aluminum oxide insulating layer 34 on an outer surface thereof that is formed from the high purity aluminum layer 32. The layers in FIG. 2 are not shown to scale.

Figure 5:
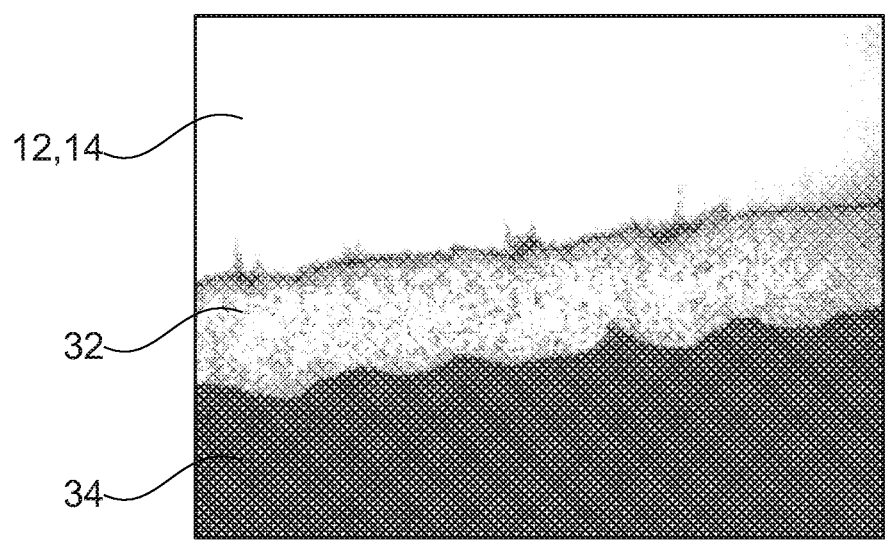
FIG. 5 is a 500× magnification photo of an example of the insulating coating on the bearing component.

The high purity aluminum layer 32 and the aluminum oxide insulating layer 34 preferably have less than 2% voids or inclusions, and more preferably less than 0.2% voids or inclusions. In accordance with one embodiment, there are virtually zero voids or inclusions as indicated by a test sample examined at a 500:1 scale enlargement. This is shown in FIG. 5.

As shown in detail in FIG. 3, the aluminum oxide insulating layer 34 can be sealed, as indicated by seal layer 36. This seal layer can be formed via a hot water seal in which the aluminum oxide layer or at least an outer surface thereof is converted to a hydrated form which reduces the pore size. A further coating such as Teflon or any other insulating sealant can optionally be used with or in place of the hot water seal.

As shown in FIG. 2, preferably the insulating coating arrangement 30 is located on the outer mounting surface 26 of the outer ring 12 and the raceway 22 does not include the insulating layer. Alternatively, the inner mounting surface 28 of the inner ring 14 includes the insulating coating arrangement 30 and the raceway 24 of the inner ring 14 does not include the insulating coating arrangement 30. It is also possible for both the outer ring 12 and the inner ring 14 to include the insulating coating arrangement 30. The aluminum oxide insulating layer 34 preferably has an electrical resistance of at least 10 MΩ at 50 VDC. More preferably, the aluminum oxide insulating layer 34 or aluminum oxide insulating layer 34 with the seal layer 36 has a resistance of at least 50 MΩ at 1000 VDC.

Preferably, the high purity aluminum layer 32 has a final thickness of 25-200 µm. Additionally, the aluminum oxide insulating layer 34 has a final thickness of 25-200 µm. More preferably, the high purity aluminum layer 32 and the aluminum oxide insulating layer 34 each have a thickness of 40-75 µm. Preferably, the total coating thickness is 50-400 µm and more preferably in the range of 75-125 µm.

Referring to FIG. 4, a method for providing an electrically insulating coating on a bearing component, which can be the outer ring 12 and/or the inner ring 14 is provided in the flowchart 40. The method includes providing the bearing component formed from steel and machined or otherwise form to a near net shape. As show in box 41, this semi-finished bearing component is preferably a bearing ring and all surfaces are finished to final dimensions with the possible exception of the raceway which may need final finishing after the insulating coating arrangement 30 is applied. Preferably, these bearing components are washed or cleaned as indicated in box 42. This cleaning is by known processes, using detergents and/or solvents. If necessary, the surface of the bearing components to be coated can be roughened as indicated in box 43. Preferably, roughening is done only on the areas to be coated and not the raceways 22, 24, and a surface roughness of Ra≥6 µm is provided to enhance bonding of high purity aluminum onto the surfaces of the bearing component to be coated. A final cleaning step can be provided as indicated in box 44 which can include rinsing with a solvent and/or detergent to remove any impurities including surface oils which could prevent proper adhesion of the coatings to be applied. As indicated in box 45, preferably the raceways 22, 24 of the bearing components in the form of bearing rings 12, 14 are masked. The masking can be clone with a polyester film or tape and an appropriate adhesive, which can be silicone based, or can be done with caps or plugs which are resistant to the electroplating chemicals and/or the anodizing acid. The mask is applied in a known manner to areas that are not to be coated or treated, such as the raceways 22, 24.

As shown in box 46, an anode is applied to each of the bearing components, in the form of the outer and inner rings 12, 14, and the bearing components are electroplated with high density pure aluminum, as shown in box 47, preferably to a thickness of at least about 50 µm (0.002 in). The coated thickness may vary between 25 and 200 µm depending on the application and the further processing to be carried out. The electroplating is carried out using a non-acquieous electrolyte, such as toluene, in an inert environment which allows the pure aluminum to be deposited onto the steel bearing components in a highly pure and dense state without inclusions or voids. As shown in box 48, preferably the thickness of the aluminum is verified.

This highly pure aluminum is then hard coat anodized as indicated in box 49, preferably to 50% to 60% of the thickness of the high purity aluminum layer 32, resulting in the layer of pure aluminum 32 as well as the anodized insulating layer 34 as shown in FIG. 3 which are formed on the steel bearing component in the form of the bearing rings 12, 14. Preferably, the anodization is a sulfuric acid anodization or alternately oxalic acid anodization with the bearing component forming the anode of the electrical circuit in the anodization bath. As shown in box 50, optionally a dye may be applied to the anodized surface in order to provide a color of choice to the bearing component. The anodized insulating layer 34 can optionally be sealed.

As shown in box 51, preferably the total thickness of the anodized layer 34 and the pure aluminum layer 32 is non-destructively verified. The total layer thickness for each layer is preferably in range of 50-200, and more preferably µm 40-75 µm. Preferably, the total coating thickness is 50-400 µm and more preferably in the range of 75-125 µm. In one embodiment, the total layer thickness is nominally 100 µm (0.004 in).

As shown in box 52, the raceway masking can then be removed and any final finishing or machining of the raceways 22, 24 can then be performed. Finally, as indicated in box 53, preferably electrical testing of the coating is performed to ensure that the insulating layer has a resistance of at least 10 MΩ at 50 VDC more preferably a resistance of at least 50 MΩ at 1000 VDC.

This arrangement provides for an EDM resistant rolling bearing component and more preferably a EDM resistant rolling bearing assembly such as the rolling bearing 10 shown in FIG. 1 in which one or both of the rings 12, 14 include the insulating coating arrangement 30.

The embodiments described above are considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method for providing an electrically insulating coating to a bearing component, comprising:
   providing a bearing component formed from bearing grade steel and machined or otherwise formed to a near net shape;
   electro-chemically depositing a high purity aluminum on the steel bearing component using a non-aqueous electrolyte in an inert environment to form a high purity aluminum coating at least over a portion of the steel bearing component; and
   converting a surface of the high purity aluminum coating using an acid-bath into aluminum oxide to form an insulating layer.

2. The method of claim 1, wherein the high purity aluminum and the aluminum oxide insulating layer have less than 2% voids or inclusions.

3. The method of claim 2, wherein the high purity aluminum and the aluminum oxide insulating layer have less than 0.2% voids or inclusions in a test sample examined at a 2500:1 scale enlargement.

4. The method of claim 1, further comprising:
   sealing the insulating layer.

5. The method of claim 1, wherein the high purity aluminum has a final thickness of 25-200 µm.

6. The method of claim 1, wherein the insulating layer has a final thickness of 25-200 µm.

7. The method of claim 1, further comprising:
   roughening a surface of the steel bearing component to be coated with the high purity aluminum to a surface roughness Ra of greater than 6 µm.

8. The method of claim 1, further comprising:
   masking a raceway surface of the bearing component prior to at least one of the electro-chemical depositing of the high purity aluminum or the conversion of the surface of the high purity aluminum coating using the acid-bath into aluminum oxide.

9. The method of claim 1, wherein the insulating layer has a resistance of at least 10 MΩ at 50 VDC.

10. The method of claim 1, further comprising:
    finishing a raceway surface of the steel bearing component after forming the insulating layer.

11. A rolling bearing having a steel bearing component with the insulating layer formed by the method according to claim 1.

12. A rolling bearing comprising:
an inner ring;
an outer ring;
a plurality of rolling elements located between the inner ring and the outer ring;
wherein at least one of the inner ring or the outer ring include, at least over a portion thereof, an insulating coating arrangement comprised of a layer of high purity aluminum located on a bearing grade steel base component used to form the inner ring or the outer ring and an aluminum oxide insulating layer formed on the high purity aluminum.

13. The rolling bearing of claim 12, further comprising a sealing layer on the aluminum oxide insulating layer.

14. The rolling bearing of claim 12, wherein an outer mounting surface of the outer ring includes the insulating layer arrangement.

15. The rolling bearing of claim 12, wherein an inner mounting surface of the inner ring includes the insulating layer arrangement.

16. The rolling bearing of claim 12, wherein an outer mounting surface of the outer ring and an inner mounting surface of the inner ring include the insulating layer arrangement.

17. The rolling bearing of claim 12, wherein the layer of the high purity aluminum has a final thickness of 25-200 µm.

18. The rolling bearing of claim 12, wherein the insulating layer has a final thickness of 25-200 µm.

* * * * *